United States Patent [19]

Peterson

[11] 4,194,877
[45] Mar. 25, 1980

[54] DYE-CONTAINING POLYMER COMPOSITION

[75] Inventor: John I. Peterson, Falls Church, Va.

[73] Assignee: United States of America, Washington, D.C.

[21] Appl. No.: 855,397

[22] Filed: Nov. 28, 1977

[51] Int. Cl.$^2$ .......................... D06P 3/00; C08K 5/00
[52] U.S. Cl. .......................................... 8/4; 8/DIG. 7; 252/408; 260/42.21; 526/303
[58] Field of Search .............. 8/4, DIG. 7; 260/42.21; 526/303

[56] References Cited

U.S. PATENT DOCUMENTS

| | | | |
|---|---|---|---|
| 2,084,399 | 6/1937 | Kuettel | 260/42.21 |
| 2,745,720 | 5/1956 | Schwarzenbach et al. | 260/343.4 |
| 2,791,533 | 5/1957 | Segal et al. | 424/9 |
| 3,183,208 | 5/1965 | Jurgeleit | 260/42.21 |
| 3,423,358 | 1/1969 | Burke | 260/42.21 |
| 3,462,388 | 8/1969 | Horiguchi et al. | 260/42.21 |
| 3,557,048 | 1/1971 | Wilhelm et al. | 260/851 |
| 3,594,110 | 7/1971 | Happe et al. | 8/4 |
| 3,627,472 | 12/1971 | Parsons et al. | 8/4 |
| 3,637,581 | 1/1972 | Horiguchi et al. | 8/4 |
| 4,016,133 | 4/1977 | Hydsu et al. | 260/42.21 |
| 4,017,476 | 4/1977 | Murray et al. | 260/880 R |
| 4,101,269 | 7/1978 | Champenois | 8/4 |

FOREIGN PATENT DOCUMENTS

| | | |
|---|---|---|
| 764021 | 9/1971 | Belgium . |
| 1115926 | 10/1961 | Fed. Rep. of Germany . |
| 1139092 | 11/1962 | Fed. Rep. of Germany . |
| 1266718 | 4/1960 | Fed. Rep. of Germany . |
| 2533430 | 2/1976 | Fed. Rep. of Germany . |
| 770889 | 3/1957 | United Kingdom . |

OTHER PUBLICATIONS

Colour Index (Third Edition), vol. 4 (1971), (Soc. Dyers and Colourists), pp. 4004, 4213, 4407.
Colour Index (Revised Third Edition), vol. 5, (1975), (Soc. Dyers and Colourists), pp. 5386, 5675.
Inman, J. K. and Dintzis, H. M., Biochemistry, 1969, 8, (No. 10), pp. 4074–4082.

*Primary Examiner*—A. Lionel Clingman
*Attorney, Agent, or Firm*—Holman & Stern

[57] ABSTRACT

The preparation of dye-containing compositions, in which the dye is copolymerized with an acrylic based monomer, is disclosed. A hydrophilic copolymer is formed in which the dye is present in a nondiffusible form. The dye-acrylic polymer composition can be produced in the form of microbeads by emulsion polymerization. In addition, light scattering particles may be added in the form of a material such as polystyrene microspheres.

5 Claims, No Drawings

DYE-CONTAINING POLYMER COMPOSITION

BACKGROUND AND SUMMARY OF THE INVENTION

The present invention relates to the preparation of dye-containing compositions. More particularly, the present invention relates to dye-containing compositions and methods for the preparation thereof, in which the dye is copolymerized with an acrylic based monomer to form a hydrophilic polymer in which the dye is present in a non-diffusible form. The dye - acrylic polymer composition can be produced in the form of microbeads by emulsion (water-in-oil) polymerization.

Previous methods for the bonding of dyes with other molecules include such known procedures as the use of a Mannich - type reaction, i.e., formaldehyde condensation of the dye with an amine group, as in preparation of the complexones. Such reactions are described, for example, in the following publications: R. O. Cinneide, *Nature*, 175, 47 (Jan. 1, 1955); R. Prible, *Analyst*, 83, 188–95 (1958); Swiss Patent No. 298,194 (July 1, 1954); U.S. Patent No. 2,745,720; and G. Schwartzenbach et al., *Complexometric Titrations*, Methuen Press (Barnes and Noble), 1969. Such publications do not refer to attaching dyes to polymers. A widely used method, with several commercial sources, for attaching phthalein type dyes to other moieties, is that in which an isocyanate group on a dye reacts with an active hydrogen on another moiety in non-aqueous media. Such a method necessitates a special synthesis of each dye, with formation of the attached isocyanate group during synthesis. Another approach which attaches the dye to a polymer is to derivatize the polymer, i.e., attach groups such as an amino group to the polymer so that the dye can be subsequently reacted, such methods being described for example, by J. K. Inman et al., *Biochemistry*, 8, 4074-82 (1969). These techniques require prior formation of a polymer, with subsequent dye attachment.

Various dye compositions are also described in U.S. Pat. Nos. 4,016,133 and 4,017,476. In U.S. Pat. No. 4,016,133, there is described a process in which a dye molecule is combined with monomers to result in a chemical combination of the dye with the resulting polymer. The method of this prior art patent emphasizes the requirement of including a particular type of monomer, monomer C, which has an affinity for the dye, in the mixture of monomers, A, B and C. A large number of different dye chemical types are mentioned, essentially any water soluble fluorescent dyes. Thus, a specific type of attachment of the dye to monomer C is not required. Also, this prior art patent does not state that the dye is of a type which copolymerizes, as a monomer itself, but only that the dye combines, during polymerization, with a monomer for which there is an affinity. This prior art method is thus distinguished from the present invention which is directed to the use of specific dyes which copolymerize with a single other monomer, which by itself has no dye affinity. Also, in the present invention, the dye becomes part of the polymer chain by reason of its ability to act as a component of the polymerization process.

In U.S. Pat. No. 4,017,476, a polymer of a very specific type is formed in the usual way from a monomer, but the polymer forming reaction, i.e., formation of molecular chains, is not ended in the usual way, but rather the polymer is left with reactive sites, i.e., reactive ends of the chains, which will react with a subsequently added dye molecule to combine the dye chemically with the polymer. This prior art method is distinguished from the present invention in which the dye is included in the monomer solution so that the dye molecule is essentially another monomer which becomes a part of the chain during polymerization. Thus in effect, this prior art patent covers methods of treating a preformed polymer in such a manner that dyes combine with it. Such a prior art method is not a copolymerization with the dye as is the method of the present invention.

By the present invention, there is provided a method for the preparation of a dye - containing composition, in which the dye is copolymerized with an acrylic based monomer to form a hydrophilic polymer in which the dye is present in a non-diffusible form. The present invention includes the dye during polymerization, and is thus simpler than prior art procedures. Also, the present invention is applicable to aqueous polymerization of hydrophilic polymers. The dye - acrylic polymer composition can be produced in the form of microbeads by emulsion (water-in-oil) polymerization. An additional feature includes the incorporation of light scattering particles in the form of a material such as polystyrene microspheres with the dyed polymer microspheres.

DESCRIPTION OF THE PREFERRED EMBODIMENTS

The particular dyes which have been used with good results include phenol red, brilliant yellow C.I. No. 24890 and rosolic acid. Such dyes may be employed as pH - indicating dyes and thus the particular copolymers of the present invention may be advantageously employed in an environment in which it is desired to have a pH - indicating dye which is present in a nondiffusible form. Thus the present dye compositions are well suited for use in the fiber optic pH probe as described in the U.S. patent application Ser. No. 855,384 filed simultaneously herewith, in the names of John I. Peterson and Seth R. Goldstein, said application being commonly assigned, which application is incorporated herein by reference.

The acrylic based monomer which is employed in the present invention may be, for example, acrylamide, methyl methacrylate or hydroxymethyl methacrylate (Hydron). Other suitable acrylic based monomers may be used which, like those monomers specifically mentioned, will copolymerize with the dye to provide a hydrophilic polymer.

The copolymerization of the dye with the acrylic based monomer may be carried out under the conditions which are generally employed in the polymerization of such acrylic based monomers alone, with the feature of the present invention residing in the simple inclusion of a soluble dye of the right type in the polymerization solution with the acrylic based monomer. Thus, for example, in the case where the acrylic based monomer is acrylamide, the procedure employed is the common method of using a persulfate and an amine (tetramethylethylenediamine).

The present dye-containing copolymer compositions can be produced in the form of microbeads by the use of known procedures of emulsion (water-in-oil) polymerization. As an additional aspect of the invention, light scattering materials such as, for example, polystyrene microspheres or other similar material may be added to the dye-containing copolymer. Such light scattering materials are particularly desirable when the copolymer composition is to be employed in the fiber optic pH probe previously discussed.

The following examples are illustrative of the methods of the present invention.

EXAMPLE 1

Method of making dye polyacrylamide microspheres.

Dissolve 10 mg of phenol red in 2.0 ml of 6 M acrylamide (containing 0.06MN, N'-methylene bisacrylamide). Dissolve about 50 mg ammonium persulfate in this solution, add 0.5 g Span 80; Tween 80-85: 15 parts by weight emulsifier mixture. Then add 10 ml of toluene and shake well in a test tube. Bubble nitrogen through the solution for 5 minutes, add 4 drops of tetramethylethylenediamine (TMED), shake well, continue slow bubbling of nitrogen for 15 minutes. The heat of reaction should be evident after about 1 minute following addition of TMED. Wash the resulting microspheres in a centrifuge as follows: (1) three times with ethanol: water (1:1 ratio), with sodium hydroxide solution added as needed to make the dye basic (purple color); (2) once with acetic acid solution added to make the dye acidic (red color); (3) twice with ethanol; and filter by suction until dry.

EXAMPLE 2

Addition of light scattering microspheres of polystyrene

A polystyrene microsphere latex (water suspension), such as Dow Diagnostics uniform latex particles of 0.945 micron diameter, is freeze-dried (lyophilized) to convert it to a dry powder without agglomeration of the particles. This powder is then mechanically mixed with the dried dyed polyacrylamide microspheres as prepared in Example 1. A mixture of 12 mg of polystyrene microspheres to 10 mg of the polyacrylamide microspheres of Example 1 was determined to be optimum. In the use of this mixture, the mixture may be packed tightly, in dry form, into the hollow membrane of the pH probe previously discussed, which has been assembled onto the optical fibers, and the assembly sealed with UV curing optical cement.

It is thought that the invention and many of its attendant advantages will be understood from the foregoing description, and it will be apparent that various changes may be made in the methods and compositions as described herein without departing from the spirit and scope of the invention or sacrificing its material advantages, the forms hereinbefore described being merely preferred embodiments thereof.

The embodiments of the invention in which an exclusive property or privilege is claimed are defined as follows:

1. A method for the preparation of a pH indicating dye-containing polymer composition, which comprises: subjecting acrylamide monomer to polymerization conditions in the presence of a pH indicating color changing dye material selected from the group consisting of phenol red, brillant yellow and rosolic acid to produce a hydrophilic polymer composition of acrylamide and said dye.

2. The method of claim 1 wherein said polymerization conditions comprise emulsion polymerization conditions and wherein said hydrophilic polymer composition is produced in the form of microbeads.

3. Method of claim 1 further including the step of adding a light scattering material to said hydrophilic polymer composition.

4. The method of claim 3, wherein said light scattering material comprises polystyrene microspheres.

5. A hydrophilic polymer composition of acrylamide monomer and a pH indicating color changing dye material selected from the group consisting of phenol red, brillant yellow and rosolic acid obtained by the method of claim 1.

* * * * *